United States Patent [19]

Ross

[11] Patent Number: 4,826,220

[45] Date of Patent: May 2, 1989

[54] MEANS FOR CONNECTING SUCCESSIVE SECTIONS OF TUBULAR ELEMENTS

[75] Inventor: Douglas A. Ross, Goffstown, N.H.

[73] Assignee: SWR, Inc., Weare, N.H.

[21] Appl. No.: 179,667

[22] Filed: Apr. 11, 1988

[51] Int. Cl.$^4$ ............................................. F16L 23/00
[52] U.S. Cl. ................................... 285/363; 333/254; 285/416
[58] Field of Search ................ 285/363, 416; 333/254, 333/255

[56] References Cited

U.S. PATENT DOCUMENTS

| | | | |
|---|---|---|---|
| 661,506 | 11/1900 | Fisher | 285/363 X |
| 2,955,857 | 10/1960 | Smith | 333/254 X |
| 3,201,725 | 8/1965 | Johnson | 285/363 X |
| 3,303,440 | 2/1967 | Meyer | 333/254 |
| 3,322,444 | 5/1967 | Sewell et al. | 285/363 X |
| 3,339,950 | 9/1967 | Grove | 285/363 |
| 3,794,360 | 2/1974 | Bachle et al. | 285/256 |

FOREIGN PATENT DOCUMENTS

| | | | |
|---|---|---|---|
| 1055534 | 2/1954 | France | 285/363 |
| 647772 | 2/1979 | U.S.S.R. | 333/254 |
| 980616 | 1/1965 | United Kingdom | 333/254 |

Primary Examiner—Thomas F. Callaghan
Attorney, Agent, or Firm—C. Yardley Chittick

[57] ABSTRACT

Pairs of flanges for connecting identical tubular sections in series. The flanges are complementary in form, one being welded to the end of the preceding section, the other welded to the adjacent end of the following section. The flanges include interengaging means for compelling alignment when brought together, limited areas in axial engagement which under the pressure available will enhance electrical continuity, sealing means for preventing passage of gas through the joint and means for holding the flanges together under high pressure.

1 Claim, 1 Drawing Sheet

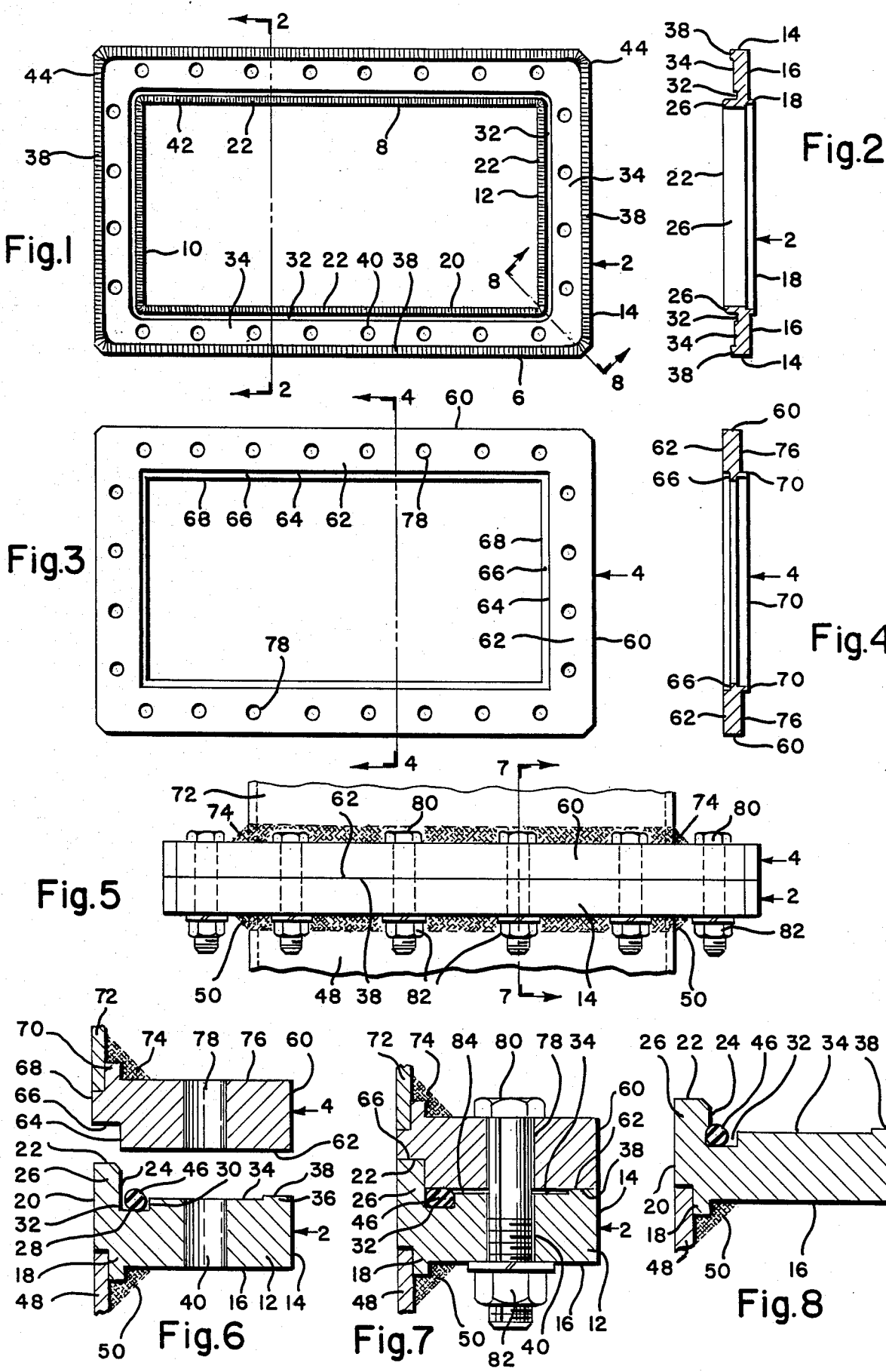

MEANS FOR CONNECTING SUCCESSIVE SECTIONS OF TUBULAR ELEMENTS

BACKGROUND OF THE INVENTION

In a televison antenna there is a continuous tubular element called a wave guide running from the transmitter to the top of the mast. The wave guide is made of a plurality of bolted together tubular sections starting at the transmitter and terminating at the mast top. Each section is rectangular in cross section and of a length permitting it to be readily handled by the construction crew. To facilitate connection of the successive wave guide sections, each section has a rectangular flange welded to its upper end and rectangular flange welded to its lower end. These flanges are of complementary construction whereby when the next section is lowered into position to engage the previous installed section the flanges as they engage will direct themselves together to create both electrical and gas sealing engagement. The engaged flanges are bolted together to provide a permanently secure joint.

It should be mentioned here that the wave guide on leaving the transmitter is customarily in horizontal position turning to the vertical on reaching the mast. For easy reference hereinafter the upper end of each section of the wave guide will be the end farthest from the transmitter regardless of the sections position in space.

SUMMARY OF THE INVENTION

The present invention is directed solely to the construction of the flanges that are welded to the ends of each section of wave guide. First, the flanges are of complementary construction so that the lower flange of the next section (called for convenience the female flange) when lowered on to the upper flange of the previous section (called for convenience the male flange) will be guided into exact position for bolting together. Secondly, two spaced parallel continuous narrow flat surfaces or tracks on the face of each flange are provided whereby these surfaces of fractional area of the total area of the face are in engagement when the flanges are connected and bolted together. The large pressure of the flanges against each other created by the plurality of tightened bolts is distributed over the relatively small are of the engaging track surfaces to produce superior electrical continuity between the two connected flanges and the wave guide sections welded thereto. The electrical contact may be further improved by applying knurling to the two narrow engaging track surfaces of one flange whereby the minute pointed or knifelike elements created by the knurling are forced into the flat engaging track surfaces of the other flange when the connecting bolts are tightened.

Thirdly, the joint is made gas tight by the provision of a continuous groove in the upper male flange in which is placed an O-ring subject to being compressed to an adequate degree by a continuous complementary flat area on the lower female flange of the added section when the flanges are bolted together. Means is also provided in the upper male flange for keeping the O-ring in its groove should the upper flange be temporarily inverted in the handling of the section prior to installation.

The location and shape of the groove in the male flange containing the O-ring in relation to the shape of the other parts of the female flange is such that as the flanges are brought together in complementary engagement it is impossible for the O-ring in the male flange to be dislodged or damaged by the female flange. The shape of the face of the female flange is such that uniform sealing pressure will be applied to the O-ring prior to the engagement of the track surfaces when the flanges are in complementary position and bolted together.

BRIEF DESCRIPTION OF THE DRAWINGS

FIG. 1 is a top plan view to reduced scale of the male flange that is welded to the upper end of a wave guide section.

FIG. 2 is a cross sectional view of the male flange taken on the line 2—2 of FIG. 1.

FIG. 3 is a bottom plan view to the same scale as FIG. 1 of the female flange that is welded to the lower end of a wave guide section.

FIG. 4 is a cross sectional view of the female flange taken on the line 4—4 of FIG. 3.

FIG. 5 drawn to scale twice that of FIGS. 1 and 3 is an end view looking from the right of FIGS. 1 and 3 when the flanges and their associated wave guide sections have been engaged and bolted together.

FIG. 6 drawn to scale twice that of FIG. 5 is a section on the line 7—7 of FIG. 5 prior to the male and female flanges having been moved into engagement.

FIG. 7 drawn to the same scale as FIG. 6 is a sectional view on the line 7—7 of FIG. 5.

FIG. 8 drawn to the same scale as FIGS. 6 and 7 is a sectional view on the line 8—8 of FIG. 1.

DESCRIPTION OF THE PREFERRED EMBODIMENT

Referring first to FIGS. 1, 2, 3 and 4, in which the two flanges are shown to reduced scale, it should be noted that a common size of tubular wave guide to be connected by these flanges is about 14 by 7 inches in section and 12 feet in length. Thus in practice the male and female flanges indicated at 2 and 4 in FIGS. 1, 2, 3 and 4 are about 17½" long and 10½" wide. However, no dimensional limitations are imposed on the present invention.

The detailed construction of the male flange 2 which is welded to the upper end of a wave guide section will now be explained by reference to FIGS. 1, 2, 6, 7 and 8.

The flange 2 is a continuous rectangular band of heavy aluminum having sides 6 and 8 and ends 10 and 12. The flange in cross section is the same at the ends and sides and thus the section of the end part 12 shown in FIG. 6 is a representative cross section of the entire flange 2.

Flange 2 has a continuous exterior vertical surface 14, a continuous underside flat surface 16, a short downwardly extending continuous lip 18, a continuous vertical inner surface 20 whose upper edge terminates at a level above the top edge of outer surface 14.

The upper surface of flange 2 comprises a continuous narrow surface or track 22 defining with vertical surfaces or walls 20 and 24 a continuous strong vertical lip 26. Vertical wall 24 terminates at its lower edge at a continuous flat surface 28 which with short vertical wall 30 defines a continuous groove 32 extending in rectangular shape around wall 24 in the upper face of flange 2.

A horizontal surface 34 at a level below the top edge of vertical exterior surface 14 extends from the top edge of wall 30 to the interior side of a very short vertical lip 36 whose upper surface 38 extends as a track continuously about the outer periphery of the face of flange 2.

A plurality of bolt holes 40, 24 in number and spaced 2" apart have been vertically drilled through the heavy central body part of flange 2.

In the preferred construction, only the surface of the continuous inner narrow track 22 will be knurled but as indicated in FIG. 1, if it be thought desirable, the surface of the outer trace 38 may also be knurled.

As shown in FIG. 5 an O-ring 46 preferably made of red silicon rubber is placed in groove 32. At each of the four corners of groove 32, the heavy lip 26 is undercut slightly as shown in FIG. 3. Since the O-ring 46 is accurately sized to be under slight tension when in groove 32, the undercutting at the corners is sufficient to hold the O-ring in groove 32 regardless of the position in space of flange 2. Groove 32 is wider and shallower than the diameter of the O-ring to provide space for the distortion that occurs when the O-ring is compressed as will be explained hereinafter.

As is shown in FIGS. 5, 6, 7 and 8, the upper end of wave guide 48 fits snugly within the confines of lip 18 and is welded thereto abut its outer circumference as at 50. The lip 18, extending away from the body of flange 2 localizes heat build up during welding which in turn reduces warping over the entire surface of the flange.

The female flange 4 will now be described. Referring to FIGS. 3, 4 6 and 7 it will be noted that in the preferred form flange 4 is of the same inner and outer dimensions as flange 2. As seen in FIGS. 3, 4, and 6 there is a continuous outer vertical surface 60 meeting with a flat horizontal under surface 62 whose inner boundary meets with continuous vertical surface 64 the height of which is equal to the vertical distance between surfaces 38 and 22 of flange 2. The upper edge of surface 64 meets with the continuous narrow horizontal under surface 66 which meets the bottom edge of the continuous inner vertical surface 68. A short continuous vertical lip 70 extends upwardly about the flange for receiving within its inner wall the lower end of wave guide section 72. Section 72 is welded to flange 4 as indicated at 74. The upper surface 76 of flange 4 running from lip 70 to the top edge of vertical surface 60 is horizontal and parallel to under surface 62.

A series of 24 bolt holes 78 aligned with bolt holes 40 in flanges 2 are bored through the heavy body portion of flange 4.

The manner in which the male and female flanges function to connect two aligned wave guide sections is as follows.

The lower section 48 already in place has welded to its upper end male flange 2. Section 72 which is to be connected to section 48 has female flange 4 welded to its lower end. Section 72 in generally vertical position, is lowered toward section 48 with flange 4 approaching flange 2 as shown in FIG. 6. The flanges can only come together when the large lip 26 of flange 2 fits within the angular space defined by surfaces 64 and 66 of flange 4. It is impossible for any part of flange 4 to engage the O-ring in groove 32 until the two flanges are approaching each other in exact alignment.

As soon as lip 26 is in position within surface or wall 64, section 72 may be lowered further and gravity will force it down with part of under surface 62 coming into engagement with O-ring 46. At this point, bolts 80 are dropped into the aligned holes 78 and 40, the nuts 82 are screwed on and firmly tightened forcing the flanges 2 and 4 into firm engagement. This achieves the following desirable and inventive result.

The O-ring 46 is progressively compressed to an extent limited by the engagement of a narrow continuous part of under surface 62 with the narrow continuous surface of track 38 an the engagement of the narrow continuous surfaces of tracks 66 and 22. In the preferred form in which the surface of track 22 is knurled and in which the surface irregularities created by the knurling will be forced into the face of track 66, it is preferably that lip 26 be so dimensioned vertically that tracks 22 and 66 will engage prior to engagement of tracks 38 and 62 as the flanges are brought together. Thus even if the flanges are warped, good electrical contact is assured between tracks 22 and 66 when the bolts 80 are tightened.

It will now be apparent from an inspection of FIG. 7 that O-ring 32 has been compressed sufficiently to seal the joint against passage of gas to or from the interior of the wave guides 48 and 72 and at the same time due to the clearance 84 between surfaces 34 and 62, the entire pressure applied by the bolts is carried by the small engaged areas of the two parallel narrow continuous surfaces or tracks defined by surfaces 38, 62 and 22, 66. The high pressure of these small areas against each other augmented by the knurling on track 22 against track 66 provides a superior electrical conduit between the now connected wave guide sections 48 and 72.

In the foregoing manner, the novel design of the cooperating male and female flanges, previously welded to the ends of the sections, makes it possible for the wave guide sections to be rapidly assembled without fear of misalignment or damage to the O-ring with the assured result of a gas tight connection and proper electrical conductivity.

It will also be noted that the flanges 2 and 4 when connected together are interposed between the ends of the connected wave guides 48 and 72. The electrical continuity is from the lower wave guide 48 to the male flange 2, thence to the female flange 4 and then to the upper eave guide 72. This provides an excellent electical connection in that the bolts 80 may be tightened to a maximum to create superior electrical contact between tracks 38, 62 and 22, 66 without increasing the loads on the welds 50 and 74. Welds 50 and 74 are fully adequate to hold the wave guides 48 and 72 in correct electrical contact with their respective flanges 2 and 4 but as a security measure the welds are not called upon to bear the increasing bolt loads.

While the flanges herein disclosed and claimed have been used to connect in series rectangular wave guide sections such as used in TV antennas, it is understood that they are not limited to such use. They may be used to connect tubular elements of other cross sections with the shape of the flanges modified to match the sections.

If considered expedient, the surface areas and configuration of the engaged tracks might be varied or be made intermittent whereby the pressure of the electrically engaged areas may be controlled.

While a preferred construction has been disclosed, it is intended to cover in the claims all changes and modification of the invention which do not constitute departures from the spirit and scope of the invention.

I claim:

1. A television antenna comprising two successive tubular wave guides connected by a pair of cooperating flanges interposed therebetween, a first flange being mounted on the upper end of the lower wave guide and a second flange being mounted on the lower end of the upper wave guide, said flanges having interengaging means on their opposed faces whereby the flanges may be brought into face to face engagement only by being placed in initial positions of predetermined alignment, each said flange being rectangular in plan and having its interior faces in alignment with the corresponding interior faces of the wave guide to which it is attached, each said flange having a circumferentially extending surface against which the end of its related wave guide is positioned, each said wave guide welded exteriorly about its circumference to its said flange, said flanges so shaped on their opposing faces to provide two parallel tracks on each flange which engage when the flanges are brought together to provide circuitry between the wave guides, a continuous groove in the face of said first flange, an O-ring in said groove and means on the faces of said flanges for preventing any engagement of said O-ring by the said second flange until said flanges have been brought together in the positions of said predetermined alignment, and means for clamping said flanges tightly together to compress said O-ring to provide a fluid seal between said flanges and to force said tracks together to provide electrical continuity between said wave guides.

* * * * *